(12) United States Patent
Salter et al.

(10) Patent No.: US 11,007,853 B2
(45) Date of Patent: May 18, 2021

(54) VEHICLE WINDOW OPACITY

(71) Applicant: FORD GLOBAL TECHNOLOGIES, LLC, Dearborn, MI (US)

(72) Inventors: Stuart C. Salter, White Lake, MI (US);
Paul K. Dellock, Northville, MI (US);
Bhavani Thota, Novi, MI (US);
Chester S. Walawender, Livonia, MI (US); Linh Doan, Belleville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 217 days.

(21) Appl. No.: 16/170,097

(22) Filed: Oct. 25, 2018

(65) Prior Publication Data
US 2020/0130481 A1    Apr. 30, 2020

(51) Int. Cl.
*B60J 3/04*     (2006.01)
*G02F 1/133*   (2006.01)
*G02F 1/163*   (2006.01)

(52) U.S. Cl.
CPC ............ *B60J 3/04* (2013.01); *G02F 1/13318* (2013.01); *G02F 1/163* (2013.01); *G02F 1/13312* (2021.01)

(58) Field of Classification Search
CPC .......... G02F 1/163; G02F 1/155; G02F 1/153; G02F 1/15; G02F 1/157; G02F 2001/15145; G02F 1/1524; G02F 2001/1536; G02F 1/1525; G02F 1/13439; G02F 1/1503; G02F 2201/44; G02F 2001/164; G02F 1/1533; G02F 1/161; G02F 1/1523; G02F 2001/1555; G02F 1/15165; G02F 1/13318; G02F 1/133512; B60R 1/088; B60R 2001/1215; B60R 1/12; B60R 1/1207; B60R 1/08; B60R 1/04; B60R 1/082; B60R 2001/1253; B32B 17/10055; B32B 17/10036; B32B 17/10513; B32B 17/10761; B32B 17/1077; B32B 17/10788; B32B 2551/00; B32B 37/06; B32B 17/10128; B32B 17/10174; B32B 17/10183; B32B 17/10201; B32B 17/10293; B32B 17/10477; B32B 17/10532; B32B 17/06; B32B 17/10495; B32B 37/16; B32B 17/068;

(Continued)

(56) References Cited

U.S. PATENT DOCUMENTS 9,864,252 B2    1/2018 Lam et al.
2017/0267170 A1  9/2017 Be et al.
(Continued)

FOREIGN PATENT DOCUMENTS

WO     2016126460     8/2016

OTHER PUBLICATIONS https://www.technologyreview.com/s/539946/smart-windows-just-got-a-lot-cooler/.

*Primary Examiner* — William R Alexander
*Assistant Examiner* — Sharrief I Broome
(74) *Attorney, Agent, or Firm* — David Coppiellie; MacMillan, Sobanski & Todd, LLC

(57) ABSTRACT

A method of operating a vehicle having variable opacity windows that includes customer convenience functions such as transitioning a window to transparent when the vehicle is in use as a ride-sharing vehicle and detects picking up a new passenger; or transitioning the window to transparent when a signal is received from an emergency vehicle.

12 Claims, 3 Drawing Sheets

(58) Field of Classification Search
CPC .......... B32B 17/10045; G02B 27/0101; G02B 27/58; G02B 2027/0118; G02B 26/02; G02B 5/23; G02B 2027/0178; G02B 26/005; G02B 27/0172; G02B 30/27; G02B 5/005; G02B 5/201; G02B 5/205; G02B 1/11; G02B 1/14; G02B 2027/0132; G02B 2027/0138; G02B 2027/014; G02B 2027/0141; G02B 2027/0156; G02B 25/001; C03C 17/23; C03C 17/34; C03C 17/36; C03C 17/3657; C03C 17/3681; C03C 17/007; C03C 17/09; C03C 17/225; C03C 17/2453; C03C 17/42; C03C 2217/211; C03C 2217/215; C03C 2217/231; C03C 2217/241; C03C 2217/253; C03C 2217/255; C03C 2217/256; C03C 2217/26; C03C 2217/42; C03C 2217/70; E06B 2009/2464; E06B 9/24; E06B 3/6722; E06B 7/28; E06B 2009/2405; E06B 2009/2417; E06B 2009/2643; E06B 3/66314; E06B 3/66352; E06B 2003/6638; E06B 2003/66385; E06B 2009/2411; E06B 2009/2476; E06B 3/66; E06B 3/6612; E06B 3/66328; E06B 3/66342; E06B 3/6715; E06B 3/67326; E06B 7/00

See application file for complete search history.

(56) References Cited

U.S. PATENT DOCUMENTS

| | | | |
|---|---|---|---|
| 2017/0305349 A1 | 10/2017 | Naboulsi | |
| 2017/0328121 A1 | 11/2017 | Purdy et al. | |
| 2018/0037164 A1* | 2/2018 | Newman | G02F 1/163 |
| 2018/0088431 A1 | 3/2018 | Holt et al. | |
| 2018/0114079 A1* | 4/2018 | Myers | G06K 9/00845 |
| 2018/0118147 A1* | 5/2018 | Staton | B60R 21/0134 |
| 2018/0314081 A1* | 11/2018 | Hoggarth | G02F 1/0121 |
| 2019/0366811 A1* | 12/2019 | O'Keeffe | B60W 40/02 |

* cited by examiner

VEHICLE WINDOW OPACITY

BACKGROUND OF THE INVENTION

The present invention relates to vehicles and more particularly to controlling the opacity of vehicle windows based on various internal and external parameters of the vehicle operating environment.

Electrochromic glass is used for vehicle windows, and allows the windows to shift from translucent to transparent or opaque when an electric voltage is applied. The reduction of light transmission may vary from as little as twenty percent up to ninety-five percent. Such uses of electrochromic glass may include car rear view mirrors, aircraft windows, buildings, etc., and may have manual controls or even automatic control based on, for example, detected sun load.

SUMMARY OF THE INVENTION

An embodiment contemplates a method of operating a vehicle comprising: transitioning a window to transparent when a ride-sharing vehicle detects picking up a new passenger; and transitioning the window to transparent when a signal is received from an emergency vehicle.

An embodiment contemplates a method of operating a vehicle comprising: transitioning a window to transparent when a vehicle impact is detected; and transitioning the window to transparent for a predetermined time when the vehicle turns onto another road.

An advantage of an embodiment is that electrochromic glass may be employed, along with sensors, in a vehicle, to improve the vehicle passengers' interaction with the vehicle. Such advantages may be particularly useful in ride-share and autonomous automotive vehicle.

Advantages of electrochromic glass in an automotive vehicle may include potentially saving vehicle battery charge by reducing a load on a heating, ventilation and air conditioning system. For example, allowing for full transparency of the windows when a sunload sensor indicates sunlight is present and the ambient temperature is cold/cool, or providing opacity of the windows when the sunload sensor indicates sunlight is present and the ambient temperature is warm/hot.

Further advantages of electrochromic glass in an automotive vehicle may include automatic disabling of opaque windows in a ride-share vehicle when multiple bookings (i.e., people who booked rides in the vehicle separately) are riding in the vehicle. The windows may be automatically made transparent in a ride-share vehicle when the vehicle speed drops below five miles per hour (eight Kilometers per hour) during a stop to pick up a rider. The windows may also be automatically made transparent if the vehicle detects an impact event or near impact event and remain transparent until manually activate to become opaque or the particular vehicle ride ends. In addition, the windows may be automatically made transparent when a Bluetooth Low Energy (BLE) signal is received from a police/emergency vehicle within a certain distance.

Another advantage with electrochromic glass in an automotive vehicle may include automatically turning the windows opaque or translucent at night when an interior light is on in the vehicle passenger compartment.

DETAILED DESCRIPTION

Figure 1:
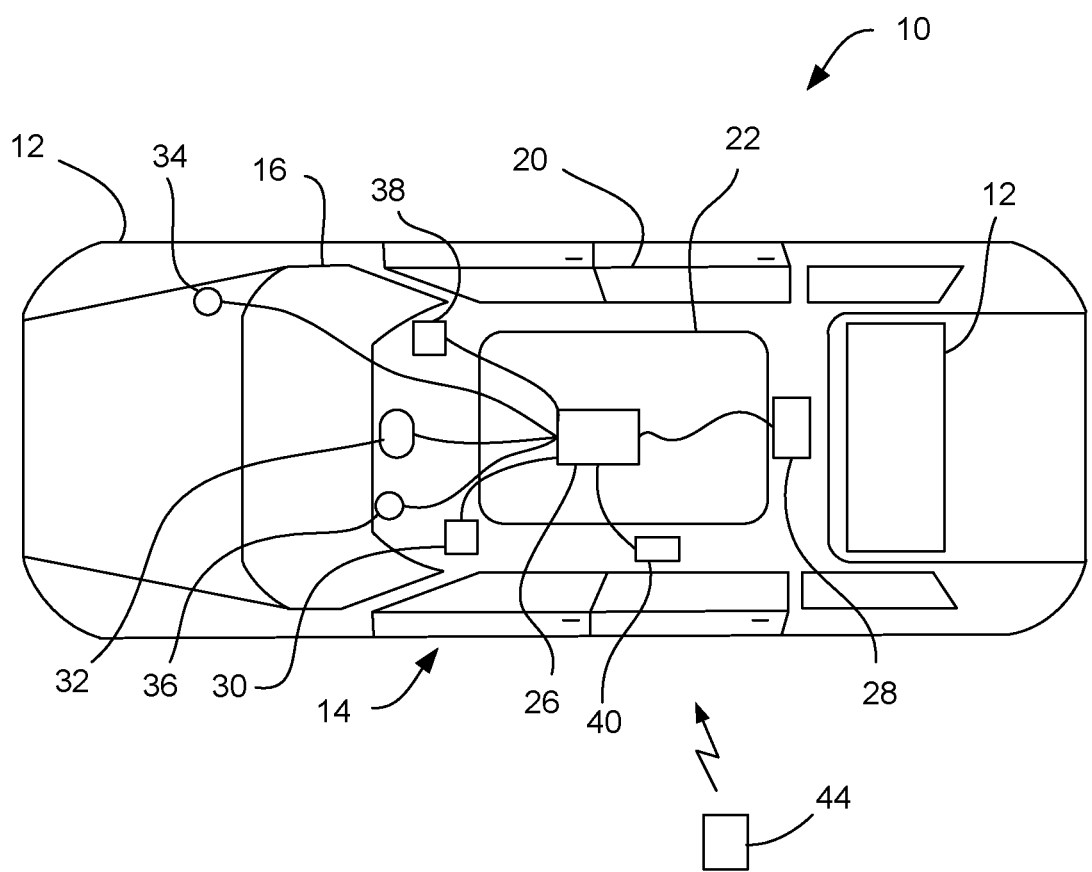
FIG. 1 is a schematic view of an automotive vehicle.

FIG. 1 illustrates an automotive vehicle 10 having a body 12, with windows 14 at various locations around the body 12. The windows 14 may include a windshield 16, and backlight 18, side windows 20 and a moon-roof 22. Each of the windows 14 may be electrochromic glass that can transition between various amounts of opacity, from close to or fully opaque, to translucent (semi-transparent), to close to or fully transparent. As used herein, the term opacity means the degree to which something is opaque; the term opaque means not able to see through; the term transparent means allowing light to pass through so that objects behind the windows can be seen; and translucent means allowing light but generally not detailed images to pass through, semi-transparent. When percentages are mentioned, this is based generally on how close the translucence is between fully transparent and fully opaque. For example, 5% transparent is essentially 95% opaque with regard to the translucence of the window.

A controller 26 is in communication with each window 14 that is electrochromic, and can cause an electric power source 28 to apply an electric voltage selectively to one or more of the particular electrochromic windows to vary the opacity of the windows. Since electrochromic glass and the application of electric voltage to it to change opacity is known to those skilled in the art, the details of the materials used to form the glass and the way in which the voltage is applied to the glass will not be discussed herein.

Figure 2:
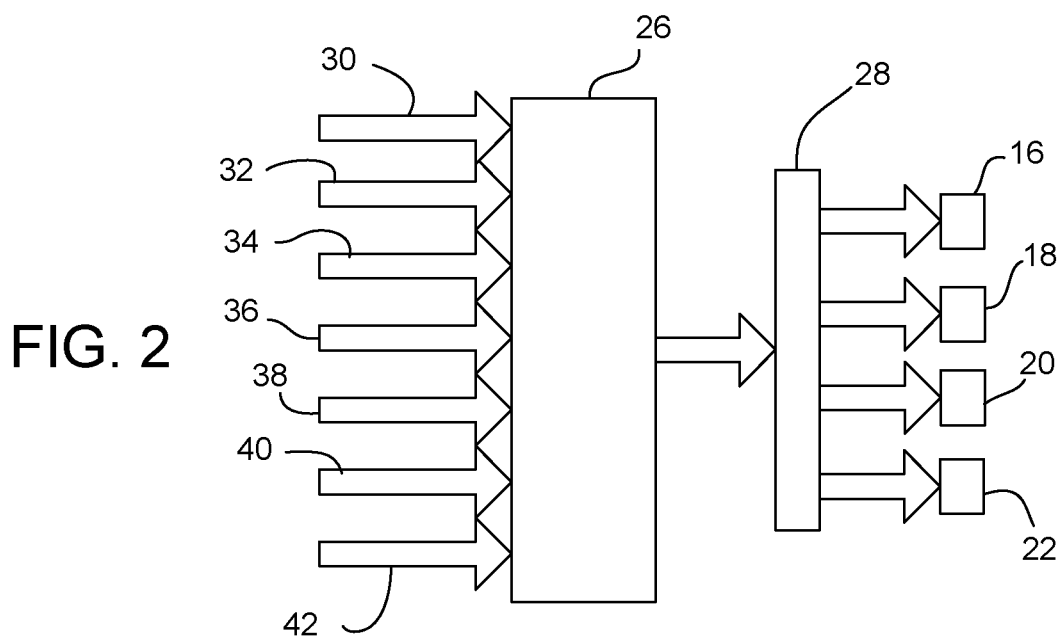
FIG. 2 is a schematic view of inputs/outputs of a controller.

FIGS. 1-2 illustrate various vehicle sensors and other inputs that may be employed by the controller 26 to determine when to change the opacity of one or more windows 14 by using the power source 28 to send voltage to one or more of the windows 14 (windshield 16, backlight 18, side windows 20 and/or moon-roof 22). The controller 26 may be a separate controller or may be incorporated into another vehicle controller, such as for example a vehicle body controller, if so desired.

The sensors that may provide inputs to the controller 26 may be, for example, a steering angle sensor 30, a sunload sensor 32, an ambient air temperature sensor 34, vehicle interior temperature sensor 36, vehicle impact sensors 38, Bluetooth emergency vehicle detection sensor 40, etc. For the most part, these sensors may be ones that are already employed with other systems on the vehicle and need not be added to provide the functionality desired for controlling window opacity.

Inputs to the controller 26 may include ride-share booking information 42, which may be received remotely, for example, via a cellular or other type of wireless communication network 44. This information may include locations of pickup and drop-off, the number of passengers at each pickup and drop-off, and other information relevant to ride-share operations.

Figure 3A:
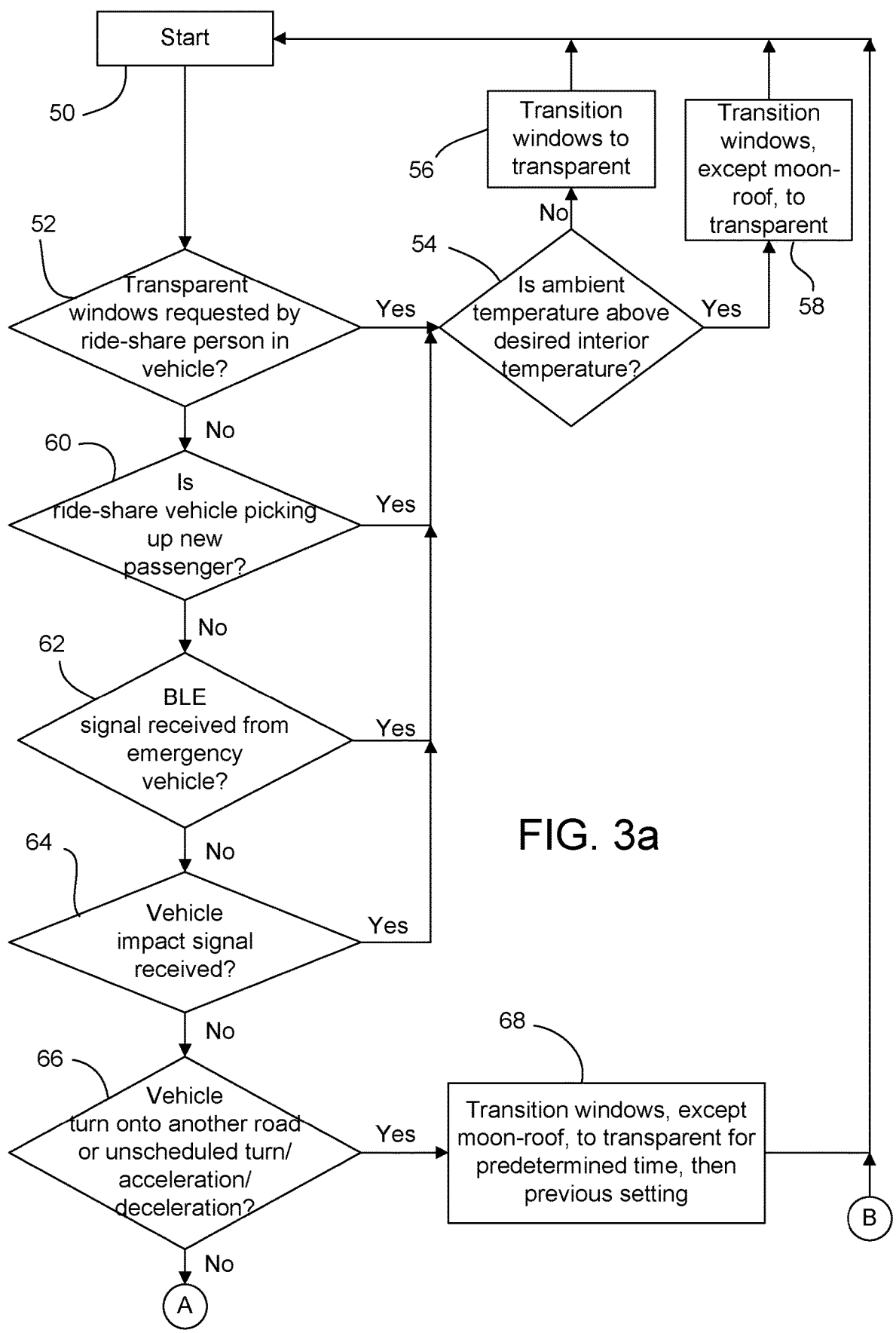
FIGS. 3a and 3b are a flow chart relating to controlling the opacity of vehicle windows.
Figure 3B:
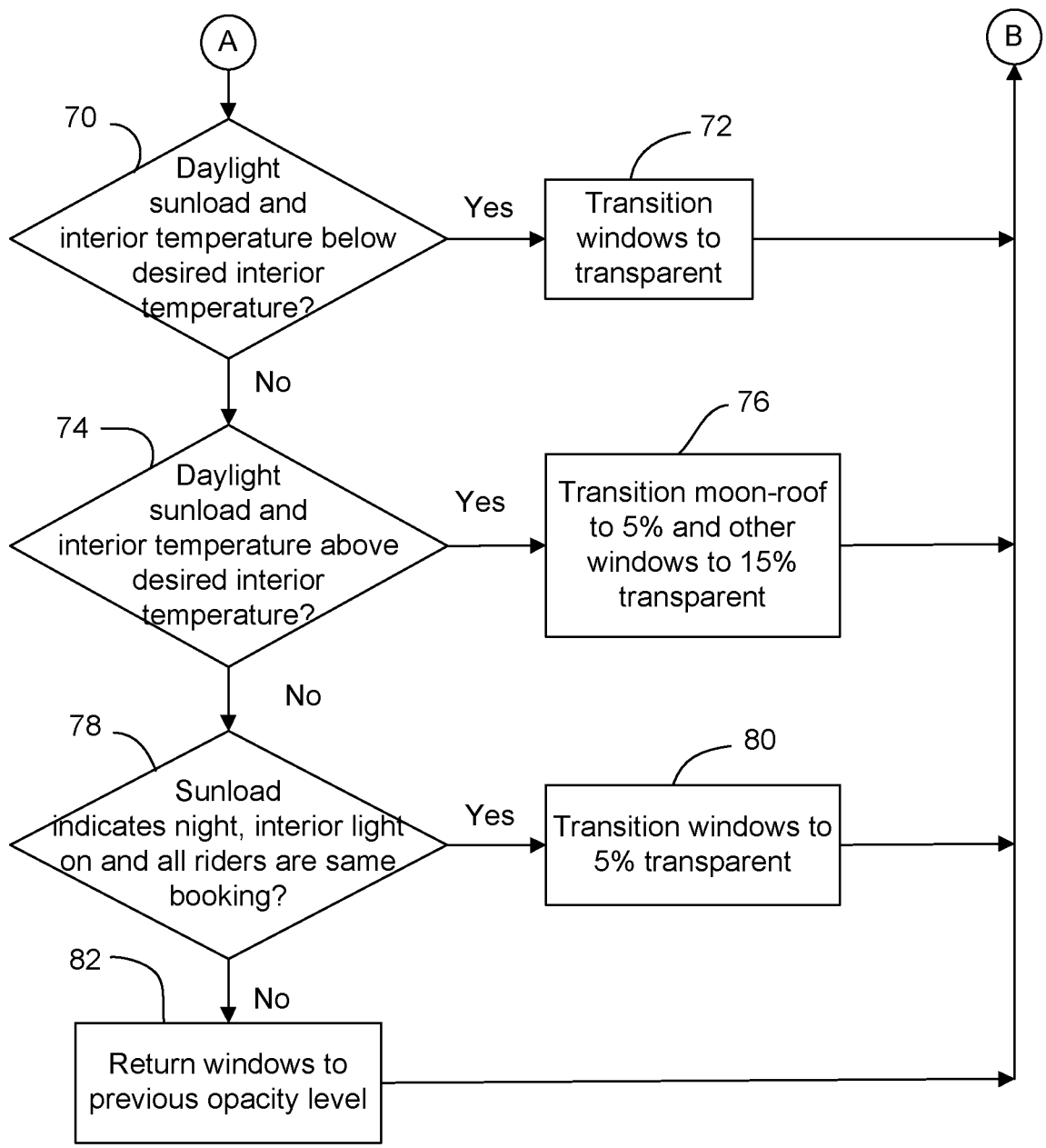

FIGS. 3a-3b are a flow chart illustrating an example operating method the controller uses to control the opacity of the windows 14 of FIGS. 1-2. While FIGS. 3s-3b illustrate a particular order of considering what window opacity to employ for given situations, these steps may be considered in a different order depending upon the desired emphasis for the importance or criticality for each vehicle situation presented, or some steps may be left out of the process for particular vehicles, if so desired.

The determination as to the control of the opacity of the windows 14 starts, step 50, based on vehicle 10 and passenger conditions. Whether transparent windows 14 is requested by a person in the vehicle 10 (who may be a ride-share customer) is determined, step 52.

If yes, then a determination is made as to whether an ambient temperature around the vehicle 10 is above a desired interior temperature for the vehicle 10, step 54. The desired temperature may be based on a temperature setting for an automatic heating, ventilation and air conditioning (HVAC) system—such systems are known in the art and will not be discussed in more detail herein. If the ambient temperature is not above the desired interior temperature, then the controller 26 may transition the windows 14 to transparent (which may also include close to although not quite fully transparent), step 56. If the ambient temperature is above the desired temperature, step 54, then the controller 26 may transition the windows 16, 18, 20, except for the moon-roof 22, to transparent, step 58. The moon-roof not transitioning to transparent may help keep the vehicle heat load down in order to cool the vehicle interior more rapidly.

A determination is made as to whether a ride-share vehicle 10 is picking up a new passenger, step 60. If yes, then the process moves to step 54, discussed above. Transitioning some of all of the windows 14 to translucent when picking up a new ride-sharing passenger allows this new passenger to see who, if anyone, is already in the vehicle 10.

If no new passenger, then a determination is made as to whether a BLE signal has recently been received from an emergency vehicle in the vicinity of the vehicle 10, step 62. If yes, then the process moves to step 54, discussed above. Transitioning some or all of the windows 14 to translucent when receiving an emergency vehicle signal better allows the vehicle passengers to see what is occurring around the vehicle 10 and allows emergency vehicle operators to seen into the vehicle 10 if needed.

If not BLE signal, then a determination is made as to whether a vehicle impact signal has been received, step 64. If yes, then the process moves to step 54, discussed above. Transitioning some or all of the windows 14 to translucent when receiving a vehicle impact signal may better allow an emergency response for passengers in the vehicle. The impact signal may, for example, come from an airbag module, accelerometer or other type of system or sensor that may detect a vehicle impact event.

If no vehicle impact signal is received, then a determination is made as to whether the vehicle 10 has just turned onto another road (different from the one which it was just travelling on), or an unscheduled turn, unscheduled acceleration or unscheduled deceleration has occurred during a ride-share vehicle operating condition, step 66. If yes, then in step 68 the windows 16, 18, 20, except the moon-roof 22, are transitioned to transparent for a predetermined time period, and after that time period, transitioned back to the opacity for each window immediately prior to step 66. This temporary transition to translucence allows for passengers to clearly see out of the windows 14 in order to determine if the vehicle 10 is traveling to the destination, as desired, or if action needs to be taken. As such, the time period may be relatively short, for example, ten to fifteen seconds—although the time period may be set shorter or longer, as desired.

If the determination of step 66 is no, then a determination is made as to whether a daylight sunload is detected and the vehicle interior temperature is below a desired interior temperature, step 70. If yes, then the controller 26 transitions the windows 14 to transparent, step 72. Transitioning to transparent allows the vehicle interior to warm more rapidly.

If the result of step 70 is no, then a determination is made as to whether a daylight sunload is detected and the vehicle interior temperature is above a desired interior temperature, step 74. If yes, then the controller 26 transitions the moon-roof 22 to 5% (or less than 10%) transparent and the other windows 16, 18, 20 to 15% transparent (or less than 20%), step 76. By making the opacity almost fully opaque, this may keep the heat load on the vehicle interior down, thus allowing the vehicle interior to reach the desired temperature more rapidly.

If step 74 is no, then a determination is made as to whether the sunload indicates nighttime, an interior light (such as a dome light) is on and all of the current passengers in the vehicle are from the same booking (i.e., for ride-share, all passengers in the vehicle were the result of one ride-share order on from a ride-share application), step 78. If yes, then the windows may be transitioned to 5% (or less than 10%) transparent, step 80. Since all of the riders are from the same booking, then security between the different passengers may not be a concern, while the almost opaque windows 14 gives the riders more privacy from people outside of the vehicle 10.

If step 78 is not, then the controller 26 returns the windows 14 to the immediately previous opacity level, step 82.

While certain embodiments of the present invention have been described in detail, those familiar with the art to which this invention relates will recognize various alternative designs and embodiments for practicing the invention as defined by the following claims.

The invention claimed is:
1. A method of operating a vehicle comprising:
  (a) transitioning a window, which is electrochromic, to transparent when the vehicle is in use as a ride-sharing vehicle and detects picking up a new passenger;
  (b) transitioning the window to transparent when a signal is received from an emergency vehicle; and
  (c) transitioning the window to less than 10% transparent when daylight sunload is not detected, a vehicle interior light is on, and all passengers currently in the vehicle are ride-share passengers from a same booking.
2. The method of claim 1 further including:
  (c) transitioning the window to transparent when a vehicle impact is detected.
3. The method of claim 1 further including:
  (c) transitioning the window to transparent for a predetermined time when the vehicle turns onto another road.
4. The method of claim 3 further including:
  (d) transitioning the window to transparent for the predetermined time when the vehicle automatically makes an unscheduled turn, an unscheduled acceleration or an unscheduled deceleration.
5. The method of claim 1 further including:
  (c) transitioning the window to transparent when the daylight sunload is detected and a vehicle interior temperature is below a desired interior temperature.

6. The method of claim 1 further including:
(c) transitioning the window to less than 20% transparent when the daylight sunload is detected and a vehicle interior temperature is above a desired interior temperature.

7. The method of claim 6 further including:
(d) transitioning an electrochromic moon-roof window to less than 10% transparent when the daylight sunload is detected and the vehicle interior temperature is above the desired interior temperature.

8. The method of claim 1 wherein step (a) further includes maintaining a current opacity of an electrochromic moon-roof, while transitioning the window to transparent, when an ambient temperature is above a desired vehicle interior temperature.

9. The method of claim 1 wherein step (b) further includes maintaining a current opacity of an electrochromic moon-roof, while transitioning the window to transparent, when an ambient temperature is above a desired vehicle interior temperature.

10. The method of claim 1 further including:
(c) transitioning the window to transparent for a predetermined time when the vehicle automatically makes an unscheduled turn, an unscheduled acceleration or an unscheduled deceleration.

11. A method of operating a vehicle comprising:
(a) transitioning a window, which is electrochromic, to transparent when the vehicle is in use as a ride-sharing vehicle and detects picking up a new passenger; while maintaining a current opacity of an electrochromic moon-roof while transitioning the window to transparent, when an ambient temperature is above a desired vehicle interior temperature; and
(b) transitioning the window to transparent when a signal is received from an emergency vehicle.

12. The method of claim 11 wherein step (b) further includes maintaining the current opacity of the electrochromic moon-roof, while transitioning the window to transparent, when the ambient temperature is above the desired vehicle interior temperature.

* * * * *